(12) United States Patent
Hageltorn et al.

(10) Patent No.: US 9,894,675 B2
(45) Date of Patent: Feb. 13, 2018

(54) METHOD AND DEVICE FOR WIRELESS NETWORK COEXISTENCE

(71) Applicant: BlackBerry Limited, Waterloo (CA)

(72) Inventors: Göran Hageltorn, Ottawa (CA); Cristian Lambiri, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 114 days.

(21) Appl. No.: 14/031,717

(22) Filed: Sep. 19, 2013

(65) Prior Publication Data
US 2015/0079975 A1 Mar. 19, 2015

(51) Int. Cl.
*H04W 72/12* (2009.01)
*H04W 52/24* (2009.01)
*H04B 17/345* (2015.01)

(52) U.S. Cl.
CPC ...... *H04W 72/1215* (2013.01); *H04B 17/345* (2015.01); *H04W 52/244* (2013.01)

(58) Field of Classification Search
CPC ... H04W 52/143; H04W 52/16; H04W 52/18; H04W 52/34; H04W 72/042; H04W 16/10; H04W 24/10; H04W 72/12; H04W 52/241; H04W 52/365; H04W 72/0413; H04W 72/0473; H04W 72/085; H04W 72/14; H04W 72/1226; H04W 72/1278; H04W 84/12
See application file for complete search history.

(56) References Cited

U.S. PATENT DOCUMENTS

| | | | |
|---|---|---|---|
| 7,574,179 B2 | 8/2009 | Barak et al. |
| 8,009,617 B2 | 8/2011 | Sarkar et al. |
| 8,072,914 B2 | 12/2011 | Brisebois et al. |
| 8,073,481 B2 | 12/2011 | Luo et al. |
| 8,099,132 B2 | 1/2012 | Kim et al. |
| 8,195,099 B2 | 6/2012 | Bhattad et al. |
| 8,219,030 B2 | 7/2012 | Gorokhov et al. |
| 8,229,452 B2 | 7/2012 | Li et al. |
| 8,285,298 B2 | 10/2012 | Noriega et al. |
| 8,340,605 B2 | 12/2012 | Hou et al. |

(Continued)

FOREIGN PATENT DOCUMENTS

WO 2013062643 5/2013

OTHER PUBLICATIONS

Paper-7 Concepts of LTE-and-RF Parametric Receiver Tests on PHY layer 1, pp. 1 to 38.

(Continued)

*Primary Examiner* — Liton Miah
(74) *Attorney, Agent, or Firm* — Fish & Richardson P.C.

(57) ABSTRACT

A method and device are disclosed for transmission control based on conditions at a receiver. A condition for a received channel of a first wireless network when one or more transmitters for a second or additional wireless networks are transmitting is determined. A condition for the received channel when the transmitters of the second or additional wireless networks are not transmitting also is determined and the two conditions are compared. Depending on the comparison, transmission characteristics for the second wireless network may be modified to mitigate desensitization of the receiver due to the coexistence of transceivers for supporting multiple types of communication subsystems.

16 Claims, 9 Drawing Sheets

(56) References Cited

U.S. PATENT DOCUMENTS

| | | |
|---|---|---|
| 8,355,742 B2 | 1/2013 | Gorokhov et al. |
| 8,417,252 B2 | 4/2013 | Palanki et al. |
| 8,422,480 B2 | 4/2013 | Ho |
| 8,451,803 B2 | 5/2013 | Kitazoe |
| 8,457,056 B2 | 6/2013 | Zhang et al. |
| 8,467,469 B2 | 6/2013 | Lee et al. |
| 8,483,702 B2 | 7/2013 | Noriega et al. |
| 8,995,400 B2 * | 3/2015 | Geirhofer ............ H04B 7/0626 370/252 |
| 2006/0205408 A1 * | 9/2006 | Nakagawa et al. ........... 455/445 |
| 2008/0049672 A1 | 2/2008 | Barak et al. |
| 2008/0261645 A1 | 10/2008 | Luo et al. |
| 2009/0135796 A1 | 5/2009 | Nanda et al. |
| 2009/0137241 A1 | 5/2009 | Yavuz et al. |
| 2009/0285158 A1 | 11/2009 | Rezaiifar et al. |
| 2010/0085917 A1 | 4/2010 | Gorokhov et al. |
| 2011/0081858 A1 | 4/2011 | Tolentino et al. |
| 2011/0149877 A1 * | 6/2011 | Hafeez .......................... 370/329 |
| 2012/0040620 A1 | 2/2012 | Fu et al. |
| 2012/0046026 A1 * | 2/2012 | Chande et al. ............ 455/422.1 |
| 2012/0069766 A1 | 3/2012 | Fu et al. |
| 2013/0028120 A1 * | 1/2013 | Sun et al. ..................... 370/252 |
| 2013/0044624 A1 | 2/2013 | Jung et al. |
| 2013/0114505 A1 * | 5/2013 | Haim et al. ................... 370/328 |
| 2014/0274105 A1 * | 9/2014 | Wang .................. H04W 52/244 455/454 |
| 2014/0376423 A1 * | 12/2014 | Lu ....................... H04L 25/0328 370/280 |

OTHER PUBLICATIONS

Extended European Search Report issued in European Application No. 14184904.2 dated Jan. 30, 2015, 5 pages.

* cited by examiner

300

310 Determine a first condition for a received channel at first receiver when first transmitter and second transmitter are transmitting

312 Determine a second condition for the received channel when second transmitter is not transmitting

314 Compare first condition and second condition

316 Dependent on comparison, modify transmission characteristics for second transmitter

| CQI | Channel Type | | | |
|---|---|---|---|---|
| SNR (dB) | 1 | 2 | ~ | N |
| -15 | 1 | 1 | ~ | 1 |
| -12 | 2 | 1 | ~ | 1 |
| -9 | 3 | 1 | ~ | 1 |
| -6 | 4 | 2 | ~ | 1 |
| -3 | 5 | 3 | ~ | 1 |
| 0 | 6 | 4 | ~ | 1 |
| 3 | 7 | 5 | ~ | 2 |
| 6 | 8 | 6 | ~ | 3 |
| 9 | 9 | 7 | ~ | 4 |
| 12 | 10 | 8 | ~ | 5 |
| 15 | 11 | 9 | ~ | 6 |
| 18 | 12 | 10 | ~ | 7 |
| 21 | 14 | 1 | ~ | 8 |
| 24 | 14 | 12 | ~ | 9 |
| 27 | 15 | 13 | ~ | 10 |

FIG. 4

METHOD AND DEVICE FOR WIRELESS NETWORK COEXISTENCE

TECHNICAL FIELD

The present disclosure relates to wireless communications. In particular, it relates to coexistence of multiple wireless communications technologies in a wireless device.

BACKGROUND

With the evolution of wireless technologies, antennas and transceivers for different wireless networks may be co-located in limited spaces. Computing devices are supporting increasing numbers and types of wireless technologies. Antennas for a variety of wireless networks, such as 2G, 3G, LTE, Wi-Fi and other wireless networks, may be co-located in a system or contained within a single device.

In some cases, the signal strength level received by an antenna is much weaker than the signal strength level transmitted from an antenna nearby. The content in a received signal for one wireless network could be distorted due to the noise or interference created by the transmissions by other wireless networks or by the combination of transmissions. In addition, as antennas of multiple wireless networks operate on different frequency bands within a limited space, interference between different frequency bands could occur and cause interference on received channels.

BRIEF DESCRIPTION OF THE DRAWINGS

FIG. 3 provides a flowchart of a method in accordance with an embodiment of the present disclosure;

FIG. 4 illustrates a sample channel quality indicator table in accordance with one embodiment of the present disclosure;

Like reference numerals are used in the drawings to denote like elements and features.

DETAILED DESCRIPTION OF EXAMPLE EMBODIMENTS

Figure 1:
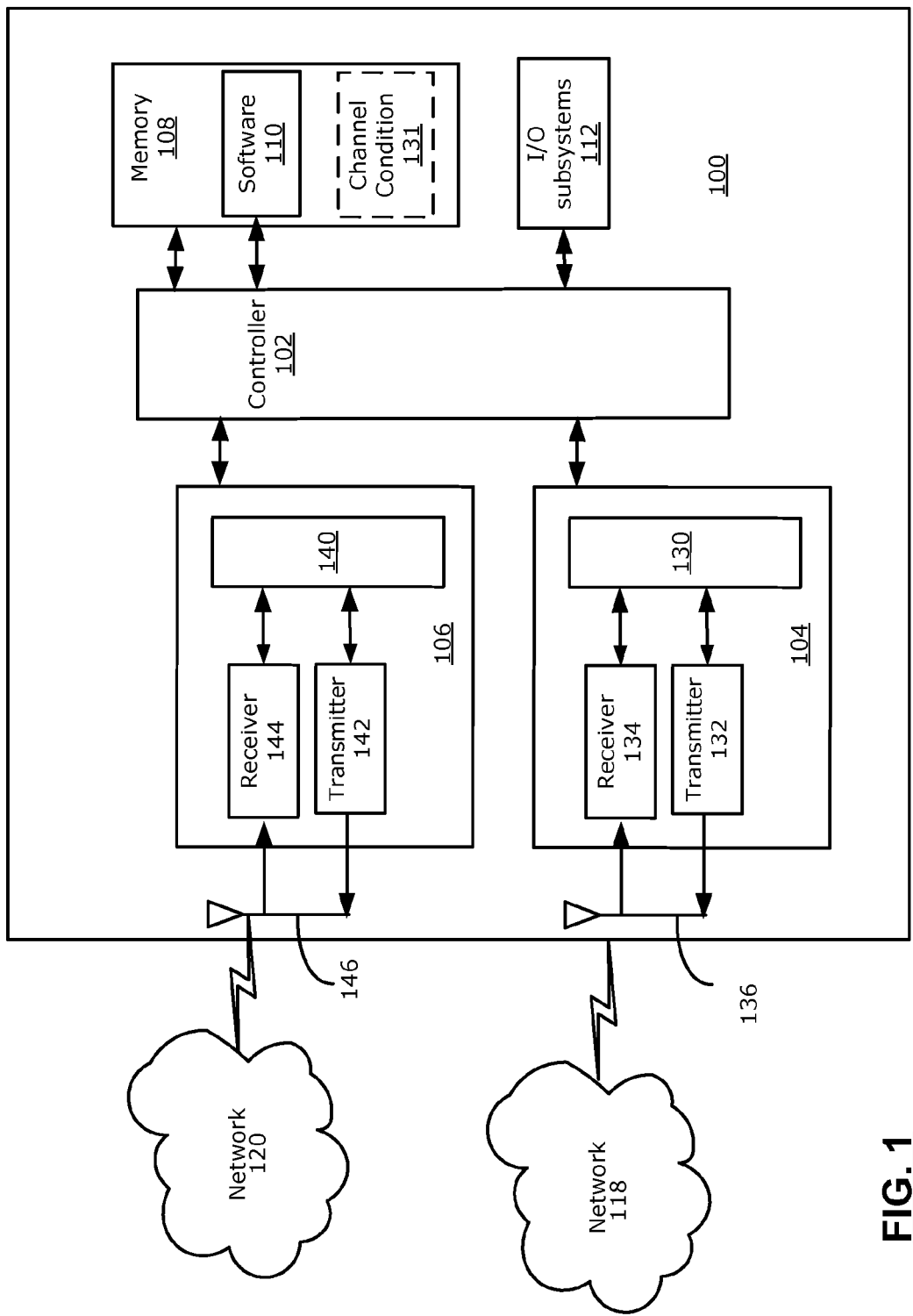
FIG. 1 is a block diagram illustrating a communications system including a wireless communications device in accordance with one embodiment of the present disclosure.

The present disclosure provides a method and device for transmitting and receiving data in two or more wireless networks, including different types of wireless networks. Methods and devices are provided to mitigate interference characteristics of various combinations of channels of one or more wireless networks, such as when different types of wireless technologies coexist in a device. In one embodiment, a first condition for a received channel at a receiver for a first wireless network is determined when a transmitter for a second wireless network is transmitting. A second condition for the received channel is determined when the transmitter for the second wireless network is not transmitting. The first condition and the second condition are compared. Based on the comparison, transmission characteristics of the second transmitter may be modified. In another embodiment, the first condition for a received channel at a receiver for a first wireless network is determined when both the transmitter for the second wireless and a transmitter for the first wireless network are transmitting. In either case, if desensitization of the first receiver results in degradation of channel conditions above a threshold, the transmission characteristics of the transmitter for the second network may be modified. The modification of transmission characteristics may include but is not limited to backing off or reducing the transmission power, or delaying or gating a transmission event. Depending on the channel conditions, the modification of transmission characteristics may include cancelling a reduction in the transmission power or other modifications to the transmission characteristics. In some embodiments, the first wireless network is based on Evolved Universal Terrestrial Radio Access (E-UTRA) or Long Term Evolution (LTE™) network standards. In some embodiments, the second wireless network is based on IEEE 802.11 standards for wireless local area networks (WLAN) or Wi-Fi.

According to one example embodiment there is provided a method in a wireless communications device for receiving data in a first wireless network and transmitting data in at least a second wireless network. The method comprises: determining a first condition for a received channel of a first wireless network when a transmitter for a second wireless network is transmitting; determining a second condition for the received channel when the transmitter for the second wireless network is not transmitting; comparing the first condition and the second condition; and dependent on the comparison, modifying transmission characteristics for the transmitter for the second wireless network.

In one embodiment, determining the first condition for the received channel of the first wireless network further comprises determining the first condition when the transmitter for the second wireless network and a transmitter for the first wireless network are both transmitting.

In a further embodiment, the transmitter for the second wireless network and the transmitter for the first wireless network both transmitting comprises a transmission event for the second wireless network and a transmission event for the first wireless network overlapping at least partially during a channel condition window.

In some embodiments, determining the first condition occurs during the receiving of data at the received channel for the first wireless network. In some embodiments, determining the second condition occurs during the receiving of data at the received channel for the first wireless network.

In some embodiments, determining the second condition for the received channel when the transmitter for the second wireless network is not transmitting comprises determining the second condition at the receiver for the first wireless network when a transmission event for the second wireless network and a transmission event for the first wireless network do not overlap during a channel condition window.

In some embodiments, in response to the comparison indicating that the first condition differs from the second condition by a first threshold, modifying transmission characteristics comprises at least one of reducing a transmission power and delaying a transmission event.

In some embodiments, in response to the comparison indicating that the first condition differs from the second condition by less than the first threshold, modifying transmission characteristics comprises cancelling a reduction of transmission power.

In some embodiments, in response to the comparison indicating that the first condition differs from the second condition by less than a second threshold, modifying transmission characteristics comprises increasing a transmission power.

In some embodiments, in response to the comparison indicating that the first condition differs from the second condition by less than a second threshold, the transmission characteristics for the transmitter for the second wireless network are not modified. In some embodiments, the first threshold, the second threshold or both the first and second threshold are set based on priorities assigned to or associated with the first and second wireless networks. In some embodiments, the first threshold, the second threshold or both the first and second threshold are set based on priorities assigned to or associated applications sending and receiving data over the first and second wireless networks.

In some embodiments, the first wireless network comprises a time division duplex (TDD) mode network. In some embodiments, the first wireless network comprises frequency division duplex (FDD) mode network.

In some embodiments, the method is implemented based on a determination that interference between a transmit channel of the first wireless network and a transmit channel of the second wireless network may impact the received channel.

In some embodiments, an antenna of the transmitter for the second wireless network and an antenna of the receiver for the first wireless network are located within a wireless communications device.

In some embodiments, the first condition comprises an average of selected samples of Channel Quality Indicators (CQI). The selected samples of CQI may be sampled in a cluster. In some embodiments the second condition comprises an average of selected samples of Channel Quality Indicators (CQI). In some embodiments, an exponential averaging IIR filter with programmable coefficients may be applied for determining the first condition and an exponential averaging IIR filter with programmable coefficients may be applied for determining the second condition.

In some embodiments, the first wireless network comprises a wireless network based on long term evolution (LTE) standards.

In some embodiments, the second wireless network comprises a wireless local area network (WLAN) based on IEEE 802.11 standards.

According to another example embodiment there is provided a wireless communications device comprising: a first receiver and a first transmitter for connecting to a first wireless network; a second transmitter for connecting to a second wireless network; and a processor. The processor is configured to: determine a first condition for a received channel of the first wireless receiver when the second transmitter is transmitting; determine a second condition for the received channel when the second transmitter is not transmitting; compare the first condition and the second condition; and based on the comparison, modify transmission characteristics for the second transmitter.

In some embodiments, the processor is further configured to determine the first condition at the first receiver when both the second transmitter and the first transmitter are transmitting.

In some embodiments, the processor is configured to, in response to the comparison indicating that the first condition differs from the second condition by a first threshold, modify transmission characteristics by at least one of reducing a transmission power and delaying a transmission event for the second transmitter.

In some embodiments, the processor is further configured to, in response to the comparison indicating that the first condition differs from the second condition by less than the first threshold, modify transmission characteristics by cancelling a reduction of transmission power.

In some embodiments, the processor is configured to determine the first condition and the second condition by filtered values of selected samples of channel quality indicators (CQI). In some embodiments, the filtered values comprise mean values of CQI. In some embodiments, the processor is configured to apply an exponential averaging IIR filter with programmable coefficients for determining the first condition and an exponential averaging IIR filter with programmable coefficients for determining the second condition.

In some embodiments, the first receiver and the first transmitter are configured to operate in a long term evolution (LTE) wireless network. In some embodiments, the second transmitter is configured to operate in a IEEE 802.11 wireless local area network (WLAN).

According to another example embodiment there is provided a computer-readable storage medium in a wireless communications device, the medium having stored thereon computer-readable and computer-executable instructions, which, when executed by a transceiver, cause the wireless communications device to perform actions comprising determining a first condition for a received channel of a first wireless network when transmitter for a second wireless network is transmitting; determining a second condition for the received channel when the transmitter for the second wireless network is not transmitting; comparing the first condition and the second condition; and based on the comparison, modifying transmission characteristics for the transmitter for the second wireless network.

Example embodiments described below refer to a wireless communications device such as a cellular telephone, smartphone, a PDA (personal digital assistant) enabled for wireless communication or other electronic computing device supporting wireless communications which communicate voice, data or voice and data signals with one or more radio access networks, including different types of radio access networks. References are made to Evolved Universal Terrestrial Radio Access (E-UTRA) or Long Term Evolution (LTE™) network standards and terminology, and to wireless local area networks (WLAN) based on IEEE 802.11 standards, but it should be understood that the present disclosure is not limited to a particular wireless communications system or standard. The devices described herein also may support wired communications.

FIG. 1 illustrates a wireless communications device 100 in which example embodiments described in the present disclosure can be applied. Depending on the functionality provided by the wireless communications device 100, in various embodiments, the device may be a multiple-mode communications device configured for both data and voice communications.

The wireless communications device 100 includes a controller 102 such as a microprocessor, which controls the overall operation of the wireless communications device 100. The wireless communications device 100 includes multiple communications subsystems which coexist in the device 100 to support communications via different radio technologies. In one embodiment, the wireless communications device 100 includes at least two communication subsystems for connecting to wireless networks, such as a first wireless communications subsystem 104 and a second wireless communications subsystem 106. The controller 102 interacts with other device components such as memory 108, system software 110 stored in memory 108 and input/output subsystems 112. In some embodiments, the wireless communications device 100 may function as a server or access point for one or more wireless networks and also as a user device for one or more other wireless networks.

The wireless communications subsystem 104 provides for wireless communications between the wireless communications device 100 through a first communications network 118 to other systems or devices. The wireless communications subsystem 106 provides for wireless communications between the wireless communications device 100 through a second communications network 120 to other systems or devices. The other systems or devices (not shown) need not be a similar device. In one embodiment, the first wireless communications subsystem 104 is configured to support communications over a network based on Evolved Universal Terrestrial Radio Access (E-UTRA) or Long Term Evolution (LTE™) standards. In one embodiment, the second wireless communications subsystem 106 is configured to support communications over a wireless local area network (WLAN) based on IEEE 802.11 standards. Communications with other radio access technologies and networks also may be supported. In other embodiments, the network communications subsystems 104, 106 or additional network communications interfaces may support other radio access technologies and network communications such as but not limited to Bluetooth®, Global Navigation Satellite System (GNSS), Global System for Mobile communications (GSM), General Packet Radio Service (GPRS) and other 3GPP communications.

The communication subsystem 104 includes a processing module 130, a transmitter 132 and a receiver 134, which transmit and receive signals through antenna element 136 to establish a radio link with the communications network 118. The communication subsystem 106 includes a processing module 140, a transmitter 142 and a receiver 144, which transmit and receive signals through antenna element 146 to establish a radio link with the communications network 120. The processing modules 130, 140 may comprise a modem or a digital signal process or other processing modules. It will be appreciated that the functions of the communications subsystems 104, 106 may be carried out by different transceiver or modem components and the transmitters 132, 142 and receivers 134, 144 are shown separately for illustrative purposes. The communication subsystems 104, 106 also may include associated components as shown in the wireless communications device 800 of FIG. 8, such as local oscillators (LOs) 823, and a processing module such as a digital signal processor (DSP) 830. The antenna elements 136, 146 may be embedded or internal to the wireless communications device 100. The communication subsystems may support multiple transmitters, receivers and multiple antenna elements. As will be apparent to those skilled in the field of communication, the particular designs and components of the communication subsystems 104, 106 depend on the communications network 118, 120 in which wireless communications device 100 is intended to operate.

The wireless communications device 100 may send and receive communication signals over the communications networks 118, 120 after the required network registration or activation procedures have been completed. Signals received by the antennas 136, 146 through the networks 118, 120 are input to the wireless subsystems 104, 106 which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the communications subsystems 104, 106. In a similar manner, signals to be transmitted are processed, including modulation and encoding, for example, by the communications subsystems 104, 106. These processed signals are input to the transmitter for digital-to-analog (D/A) conversion, frequency up conversion, filtering, amplification, and transmission to the communications network 118, 120 via the antennas 136, 146.

In the course of the device 100 sending and receiving signals to two or more wireless networks 118, 120, desensitization or electromagnetic interference may occur at a receiver, such as at receiver 134, preventing the receiver 134 from correctly receiving signals and data contained therein. Such interference may result in a reduction of data throughput. The receiver 134 may be impacted by transmissions from the transmitter 142, or by transmissions from the transmitter 142 and transmitter 132 and intermodulation effects. Interference and poor performance of the receiver 134 also may be due to other causes including but not limited to path loss, noise, inter- and intra-cell interference as well as capabilities of the receiver 134. The amount of desensitization may depend on the networks 118, 120, and the power and frequency of transmissions by the transmitters 142, 132.

For example, a communications device 100 operating in an E-UTRA Band 40 network, being a time-division duplex (TDD) mode network, has operating band of 2300-2400 MHz which is close to a 2.4-2.5 GHz band of an 802.11 WLAN or "Wi-Fi" network. Some combinations of transmissions over certain frequencies within this LTE band and transmissions over certain Wi-Fi channels or frequencies may result in significant desensitization at the receiver for the LTE communications interface. As a further example, a communications device 100 operating in an E-UTRA Band 7 network, being a frequency-division duplex (FDD) mode network, has a downlink operating band of 2620 MHz-2690 MHz and an uplink operating band of 2500-2570 MHz which also are close to a 2.4-2.5 GHz band of an 802.11 WLAN or "Wi-Fi" network. Some combinations of transmissions over certain frequencies within this LTE band and transmissions over certain Wi-Fi channels or frequencies may result in significant desensitization at the receiver for the LTE communications interface. Thus, depending on the types of networks, operating frequencies or channels used within particular networks, desensitization may vary and may be sufficient to reduce the quality of signals received and the throughput of data in one or more channels of the communications interfaces of the device 100. Occurrences of a device 100 transmitting and receiving data for two or more wireless networks may occur, for example, where the wireless communications device 100 functions as an Wi-Fi access point for a second device and exchanges data with that device while also sending and receiving data in another network, such as an LTE network.

Figure 2:
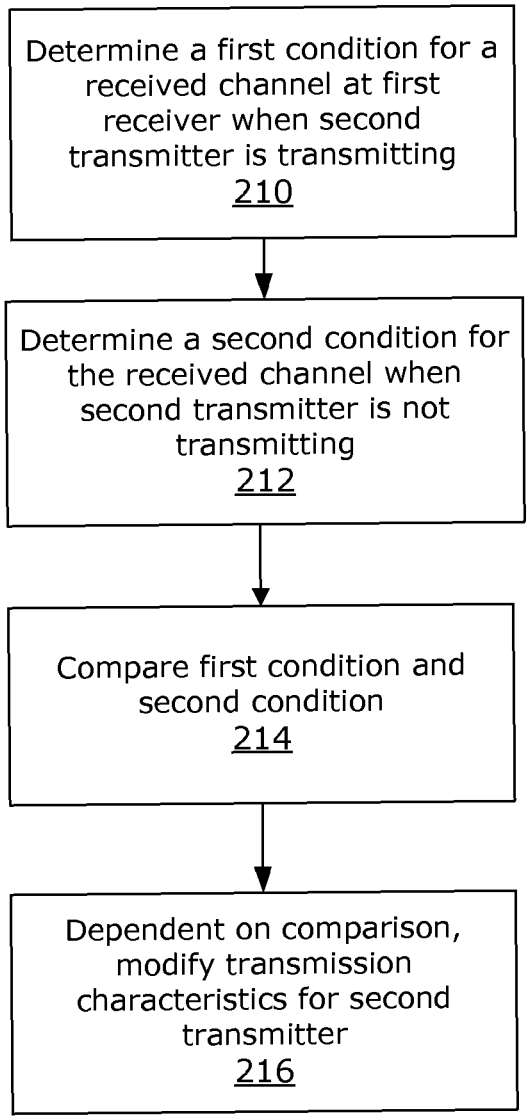
FIG. 2 provides a flowchart of a method in accordance with an embodiment of the present disclosure.

FIG. 2 illustrates a method 200 for transmitting and receiving data according to an embodiment of the present disclosure. A first condition is determined 210 for a received channel for a first wireless network 118 when a transmitter 142 for a second wireless network 120 is transmitting. A second condition is determined 212 for the received channel when the transmitter 142 for the second wireless network 120 is not transmitting. The first and second conditions are compared 214. Dependent on the comparison, transmission characteristics of the transmitter 142 for the second wireless network 120 may be modified 216. For example, as described below, if the comparison indicates that the transmitter 142 transmitting to the second wireless network 120 has a significant impact on the conditions of a channel received at the receiver 134, the transmission characteristics of the transmitter 142 may be modified, such as by reducing the power of the transmitted signal or by delaying the transmission. If the comparison indicates that the transmitter 142 transmitting to the second wireless network 120 has no impact or an acceptable impact on the conditions of a channel received at the receiver 134, the transmission characteristics of the transmitter 142 may be left unchanged or may be modified only slightly.

FIG. 3 illustrates a method 300 for transmitting and receiving data according to another embodiment of the present disclosure. A first condition is determined 310 for a received channel for a first wireless network 118 when a transmitter 142 for a second wireless network 120 and a transmitter 132 for the first wireless network 118 are both transmitting. A second condition is determined 312 for the received channel when the transmitter 142 for the second wireless network 120 is not transmitting. In this embodiment, determining the second condition 312 may include instances when the transmitter 142 for the second wireless network is not transmitting or when there is no overlap of transmission by the first and second transmitters 132, 142, as described below. The first and second conditions are compared 314. Based on the comparison, transmission characteristics of the transmitter 142 for the second wireless network 120 are modified 316. For example, as described below, if the comparison indicates that the transmitter 142 transmitting to the second wireless network 120 and the transmitter 132 transmitting to the first wireless network 118 have a significant impact on the conditions of the channel received at the receiver 134, the transmission characteristics of the transmitter 142 may be modified, such as by reducing the power of the transmitted signal or by delaying the transmission.

The conditions for received channels at the receiver 134 may be determined in a number of ways based on one or more relevant channel condition parameters including but not limited to noise, inter/intra-cell interference, signal-to-noise ratio (SNR), signal-to-interference plus noise ratio (SINR), signal-to-noise plus distortion ratio (SNDR), in-device co-existence based interference and receiver capabilities. As used herein, the term channel refers to a particular frequency or range of frequencies for receiving signals and data at the communications subsystem 104. The conditions and above parameters may be measured or determined by the wireless device 100, stored in the wireless device 100, or provided to or obtained by the wireless device 100 or by a wireless network. In some embodiments, the conditions may be represented by a numerical indicator with a range of numbers corresponding to poor to good conditions.

In some embodiments, for a receiver 134 supporting LTE communications, a condition comprising a channel quality indicator (CQI) may be determined based on a calculated SINR and channel estimate. A CQI between 1 and 15 is selected which represents the conditions and quality of signals received for the channel. The CQI corresponds to the highest modulation and coding scheme (MCS) that can be received for the channel while maintaining a block error rate (BLER) less than or equal to 0.1. In some embodiments, the CQI may be determined from a lookup table 400 as illustrated in FIG. 4. As illustrated, in this embodiment, lower CQI values are indicative of worse conditions for the received channel. In some embodiments, the CQI may be determined wideband or per sub-band.

In some embodiments, channel conditions are determined periodically by the device 100 for other purposes and are selected for implementing the methods described herein. In other embodiments, additional channel condition determinations are made for implementing the methods described herein. A parameter indicative of channel condition, such as CQI, may be sampled or generated close in time such that a mean path loss may be deemed quasi-stationary. The frequency of determining channel conditions may be adjusted in order to balance the power and processing cost of frequent calculations. In some embodiments, measurements or determinations of channel conditions are performed in clusters triggered by an event such as a significant change in received signal strength. In some embodiments, channel conditions are determined while receiving data, including but not limited to test data, control data or a combination of test data and control data.

Determining the first and second conditions 210, 212, 310, 312, may comprising filtering one or more parameters representative of channel conditions prior to a comparison of such parameters. In one embodiment, filters are implemented to obtain average parameters representative of each channel condition. A running block average filter having a programmable length, n, may be used. In other embodiments, an exponential averaging IIR filter with programmable coefficients may be used.

As described above, a first condition is determined 210 for a received channel at first receiver 134 for a first wireless network 118 when a second transmitter 142 is transmitting. A second condition is determined 212 for the received channel when a second transmitter 142 is not transmitting. In some embodiments, the condition of the channel is first determined and, if a transmission by the second transmitter 142, which may be referred to herein as a transmission event, has occurred during the window for determining the channel condition, the condition is used for determining the first condition 210. If a transmission event has not occurred, the condition is used for determining the second condition 212.

Similarly, for some embodiments of method 300, the condition of the channel is first determined. If a transmission event for the second transmitter 142 and a transmission event for the first transmitter 132 have occurred and overlapped fully or at least partially during the window for determining the channel condition, the condition is used for determining 310 the first condition. Otherwise, the condition is used for determining 312 the second condition. Thus, in some embodiments, conditions for the received channel are determined and are sorted for determining the first condition or the second condition based on whether a desensitizing transmission event has occurred.

The determination whether a transmission event for the second transmitter 142 has occurred during the window for determining the channel condition, and the determination whether a transmission event for the second transmitter 142 and a transmission event for the first transmitter 132 have occurred during the window for determining the channel condition may be made in software or hardware. Hardware power detection of transmission events at the first transmitter 132 and at the second transmitter 134 may be used to avoid the exchange and latency of messaging in software.

The first and second conditions may be compared 214, 314 in numerous ways such as by determining a ratio or difference of the first and second conditions. For example, using $y_i$=first condition and $z_i$=second condition for channel i, a comparison value α (alpha) may be determined as:

$$\alpha = y_i/z_i;$$

$$\alpha = \log(y_i) - \log(z_i);$$

or, $$\alpha = y_i - z_i.$$

As described above, $y_i$ and $z_i$ may be filtered values, such as average values, representing the first condition and second condition over a sample window n.

In some embodiments, if the comparison of channel conditions α (alpha) exceeds a threshold, β (beta), it is determined that the transmissions by the second transmitter 142 have impacted or desensitized the first receiver 134. In response, transmission characteristics for the second transmitter 142 may be modified 216, 316 to reduce the effect of the second transmitter 142 on the first receiver 134. In this case, modifying transmission characteristics 216, 316 may include reducing or backing off the transmission power for the transmitter 142. Modifying transmission characteristics 216, 316 may including delaying one or more transmission events by the second transmitter 142 in order to avoid overlapping with transmission events by the first transmitter 132, overlapping with signals being received by the first receiver, or overlapping with both.

In one embodiment, the modification of transmission characteristics 216, 316 may be proportional to the comparison of first and second conditions. For example, a larger reduction of transmission power for the second transmitter 142 may be made if there is a larger difference between the first condition and the second condition. In another embodiment, if the comparison of channel conditions, α (alpha) is lower than the threshold, β (beta), indicating that transmissions by the second transmitter 142 are not comprising conditions at the first receiver 134, the modification of transmission characteristics 216, 316 may include cancelling or modifying a previous reduction in transmission power or a previous delay of a transmission event at the second transmitter 142. In another embodiment, if the comparison of channel conditions, α (alpha) is lower than the threshold, β (beta), or if the comparison of channel conditions, α (alpha) is lower than a second threshold, $β_2$ the modification of transmission characteristics 216, 316 may include increasing the transmission power of the second transmitter 142.

The threshold β also may be configurable and set based on a number of factors such as but not limited to a priority assigned to a particular received channel at the first receiver 134. Priorities assigned to or associated with the first and second networks, or priorities assigned to or associated with one or more applications which are sending and receiving data over the wireless communication subsystems 104, 106, or both priorities, also may factor into the configuration of the threshold β. For example, if an application sending data over a first wireless network has a higher priority than an application sending data over a second wireless network the threshold β may be set to ensure that minimal desensitization occurs at the first receiver 134.

It will be appreciated that depending on how channel conditions are determined, a comparison of α being greater or less than the threshold β may indicate that the second transmitter 142 has impacted channel conditions at the first receiver 134. For example, where channel quality indicators (CQIs) are used having a range of 1 to 15, with 15 corresponding to better conditions and 1 corresponding to worse conditions as illustrated in FIG. 4, the comparison α of the first condition to the second condition being less than the threshold β indicate that the first receiver 134 is impacted by the second transmitter 142. Where other parameters are used to determine conditions for received channels at the receiver 134, a comparison α of the first condition to the second condition being greater than the threshold β may indicate that the first receiver 134 is impacted by the second transmitter 142.

In one embodiment, before initiating methods according the present disclosure, such as methods 200, 300 illustrated in FIGS. 2 and 3, a determination is made whether receiver desensitization is predicted or expected for a received channel. As described above, depending on the types and implementations of multiple wireless networks, particular combinations of transmissions over certain frequencies on one network may interfere and cause desensitization for one or more received frequencies or channels at a first receiver 134. If a determination is made that interference between a transmit channel of the first wireless network and a transmit channel of the second wireless network may impact the first receiver 134 for the first wireless network, the first and second conditions are determined and compared as described above. If interference impacting the channel condition at the first receiver 134 is not likely, these actions are not performed for the particular channel in order not to take up additional processing resources for determining and comparing channel conditions.

The determination and comparison of first and second conditions and modification of transmission parameters may be performed by the communications subsystems 104, 106 and controller 102 of the wireless communications device 100. A channel condition application or module 131 and controller 102 may or may not be involved in the actions described above in addition to the wireless communications subsystems 104, 106 depending on the implementation and factors considered when comparing channel conditions and modifying transmission characteristics for one or more transmitters.

Figure 5:
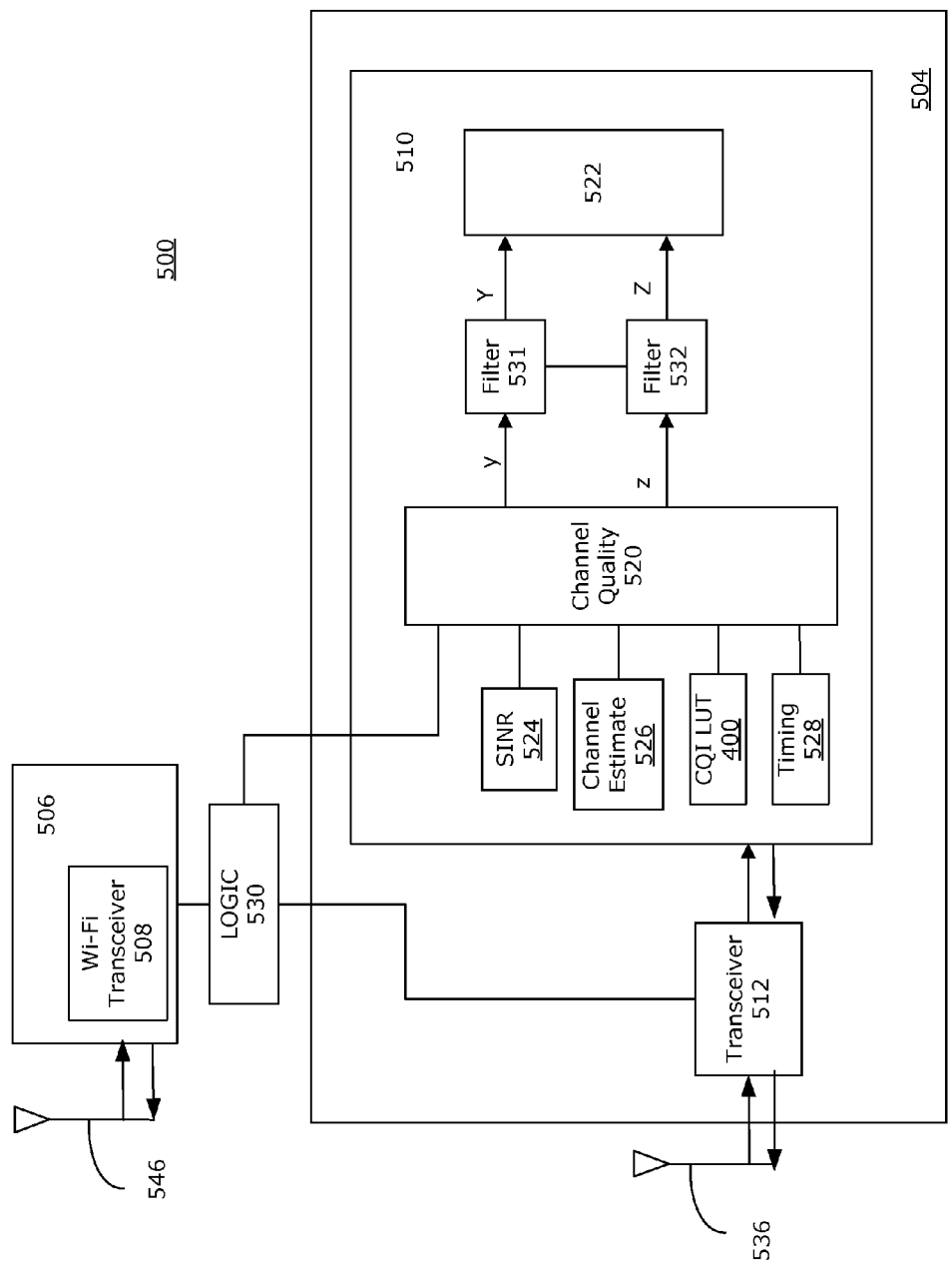
FIG. 5 provides a block diagram of part of a wireless communications device in accordance with one embodiment of the present disclosure.

FIG. 5 illustrates a part of a wireless communications device 500 for determining and comparing channel quality conditions for co-existing wireless networks according to another embodiment of the present disclosure. As illustrated, the communications subsystem 504 for communication with a first wireless network through antenna 536 includes a modem 510 and a transceiver 512 configured to support LTE communications. The communications interface 506 includes a Wi-Fi transceiver 508 and is configured to support WLAN or Wi-Fi communications through antenna 546.

The communications subsystem 504 includes a channel quality module 520 for determining conditions for one or more received channels at the transceiver 512 and a processing module 522 for determining comparing conditions and further processing. The conditions for one or more received channels may be determined based on one or more of a SINR 524, channel estimate 526, and timing information 528. In one embodiment, the receive conditions are represented by Channel Quality Indicators (CQI) which may be determined by the channel quality module 520 periodically for other purposes and or CQI values may be determined for performing the methods described herein. In one embodiment, a lookup table 400 as illustrated in FIG. 4 also may be used to determine CQI values. It will be appreciated that the functions of the communications subsystems 504, 506 may be carried out by different transceiver, modem or processing components and items are shown separately in FIG. 5 for illustrative purposes.

In one embodiment, to determine first and second conditions for a received channel, a determination of the condition is first made over a channel quality window such as by determining or obtaining a CQI value. In one embodiment, a CQI value is determined for each LTE received subframe with interval n. For an LTE network operating in TDD mode, a determination also is made whether a transmission to the Wi-Fi network has occurred during this window. If so, the CQI value is used to determine the first condition for the LTE receiver when the Wi-Fi transmitter is transmitting. For an LTE network operating in FDD mode, a determination also is made whether a transmission to the Wi-Fi network and a transmission to the LTE network have occurred and fully or partially overlapped during this window. If so, the CQI value is used to determine the first condition for the LTE receiver when the Wi-Fi transmitter and LTE transmitter are transmitting. Otherwise, the CQI value is used to determine the second condition for the received channel.

A determination whether a Wi-Fi transmission has occurred during a CQI window, or whether a Wi-Fi transmission and an LTE transmission have occurred and fully or partially overlapped during the CQI window may be made using hardware, software or both hardware and software components. In one embodiment, logic 530 including power detectors, comparators, logic gates or a combination thereof used to provide a signal to the channel quality module 520 that one or more Wi-Fi or Wi-Fi and LTE transmission events have occurred. In other embodiments, the determination whether a Wi-Fi transmission event has occurred, or whether Wi-Fi and LTE transmission events have occurred may trigger the determination of a CQI value.

Once the first and second conditions or CQI values Y, Z for a received channel are determined, further functions may be performed to filter or average the CQI values. A running block average filter having a programmable length, n, may be used for filter 531 and filter 532 to create filtered CQI values y, z. In other embodiments, an exponential averaging IIR filter with programmable coefficients may be used. In one embodiment, the processing module 522 uses the averaged or filtered CQI values y, z, to compare channel conditions. A comparison value α (alpha) with sequential index: i, may be determined as:

$$\alpha_i = y_i/z_i;$$

$$\alpha_i = \log(y_i) - \log(z_i);$$

or, $$\alpha_i = y_i - z_i$$

In one embodiment, using CQI values such as those illustrated in FIG. 4, if the comparison of channel conditions α (alpha) is less than a threshold, β (beta), it is determined that the transmissions by the Wi-Fi subsystem 506 and transceiver 508 have impacted the channel received at the LTE transceiver 512. In this case, one or more transmission characteristics of the Wi-Fi subsystem 506 and transceiver 508 may be modified as described above. The LTE communications subsystem 504 may signal the results of the comparison and channel conditions to the Wi-Fi communication subsystem 506 or to the controller of the device (not shown in FIG. 5) or to a channel condition module 131.

Figure 6A:
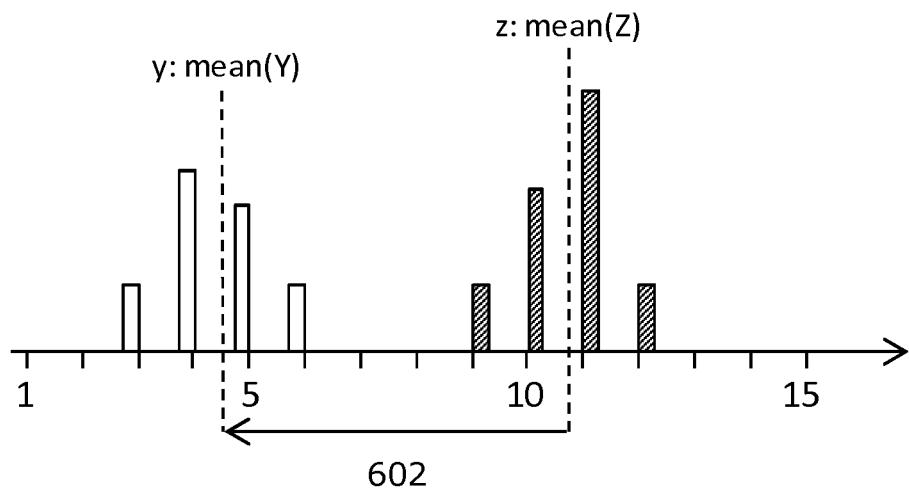
FIGS. 6A and 6B illustrate sample values of channel quality determinations.
Figure 6B:
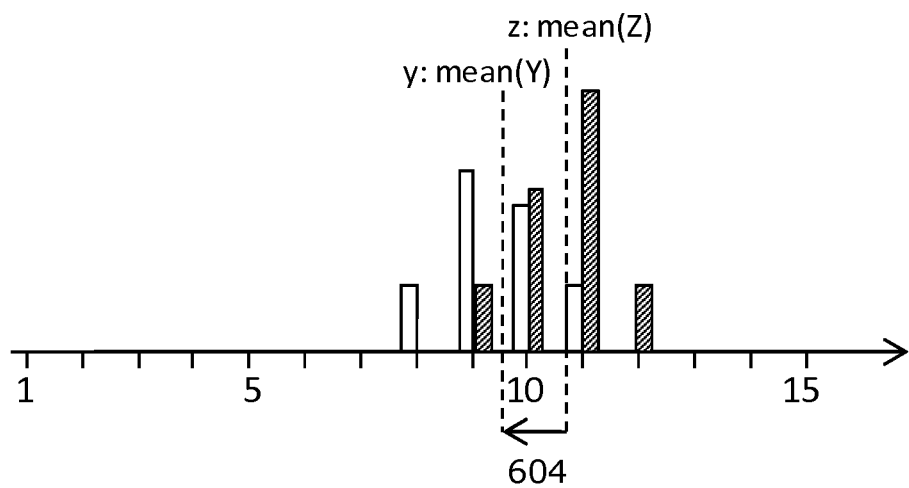

FIGS. 6A and 6B illustrate sample results of first and second conditions determined according to embodiments of the present disclosure. As illustrated, one or more CQI values Y (shown in outlined bars) may be determined for a received channel when a transmitter for an LTE communication subsystem 504 and a transmitter for Wi-Fi communication subsystem 506 have transmission events which partially or fully overlap during the CQI measurement window. A mean CQI value y may be determined. One or more CQI values Z (shown in hashed bars) may be determined for a received channel when a transmitter for an LTE communication subsystem 504 and a transmitter for Wi-Fi communication subsystem 506 have transmission events which do not partially or fully overlap during the CQI measurement window. A mean CQI value z may be determined.

Where there is a large difference in CQI values or mean CQI values as illustrated in FIG. 6A and shown by arrow 602, it is determined that the LTE and Wi-Fi transmissions are significantly impacting the LTE receiver and LTE downlink capacity. In that case, actions may be taken to review and/or modify transmission characteristics of the Wi-Fi communication subsystem 506 as discussed above. As illustrated in FIG. 6B, where there is a small difference or shift in CQI values or mean CQI values and shown by arrow 604, it is determined that the LTE and Wi-Fi transmissions are not significantly impacting the LTE receiver and LTE downlink capacity and actions may be taken to review and/or modify transmission characteristics of the Wi-Fi communication subsystem 506 as discussed above. It will be appreciated that the CQI values, means, differences and thresholds represented in FIGS. 6A and 6B are for illustrative purposes only. As described herein, different indications of receive channel conditions and various thresholds may be used.

Figure 7:
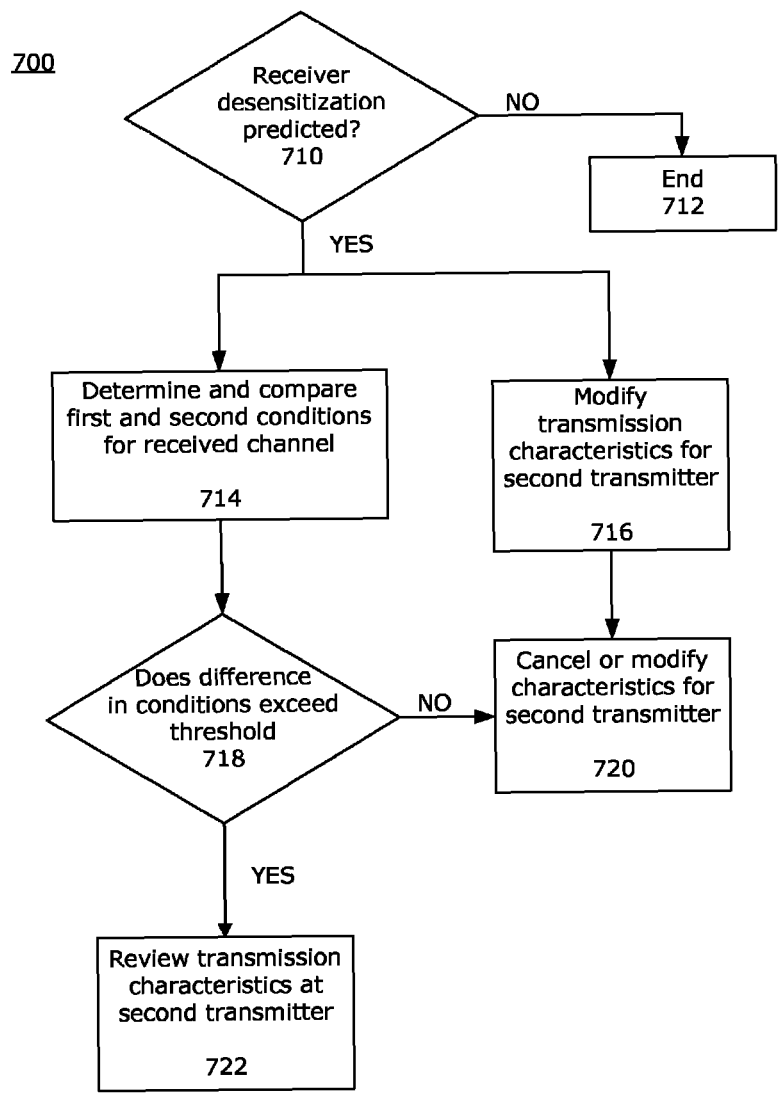
FIG. 7 provides a flowchart of a method in accordance with an embodiment of the present disclosure.

FIG. 7 illustrates a further method 700 according to embodiments of the present disclosure. A first determination is made 710 whether receiver desensitization is predicted or expected for a received channel. As described above, depending on the types and implementations of multiple wireless networks, particular combinations of transmissions over certain frequencies on one network may interfere and cause desensitization for one or more received channels at a first receiver 134. If no interference or desensitization is predicted for a received channel, no further actions are taken 712. If a determination is made that interference between channels of the first wireless network and channels of the second wireless network may impact the a received channel at the first receiver 134 for the first wireless network, first and second conditions are determined and compared 714 for the received channel, as described above.

In some embodiments, if a determination or prediction is made that interference may impact a received channel, transmission characteristics for the second transmitter 142 may be modified 716. Such modification typically comprises reducing a transmission power for the second transmitter 142. In this case, while interference and desensitization at the first receiver 134 may be prevented, thus allowing better data throughput at the first receiver 134, the reduction in transmission power or other modification of characteristics for the second transmitter 142 may unnecessarily sacrifice data throughput for the second wireless network 120. For example, where RF channel conditions or other network constraints already limit the performance of reception capabilities at the first receiver 134, the additional effects of transmissions by the second transmitter 142 or by both the second transmitter 142 and first transmitter 132 may be of no concern. Thus, limiting the second transmitter 142 sacrifices performance for the second network 120 but provides little or no improvement to conditions at the first receiver 134.

In one embodiment, if the comparison of first and second conditions shows a difference in conditions 718 that does not exceed a threshold, indicating that the predicted receiver desensitization is not occurring, further action may be taken to cancel or modify 720 the reduction of transmission power for the second transmitter 142. If the comparison of first and second conditions shows a difference in conditions 718 that exceeds a threshold, indicating that the predicted receiver desensitization is occurring, the transmission characteristics at the second transmitter may be reviewed 722. The review of the transmission characteristics at the second transmitter may result in no changes to the modifications applied 716, such as a reduction in power, based on the predicted desensitization. In some embodiments, the review of the transmission characteristics may result in a proportional adjustment of transmission characteristics, such as to decrease the reduction in transmission power based on the desensitization at the first receiver 134 being less than predicted.

Figure 8:
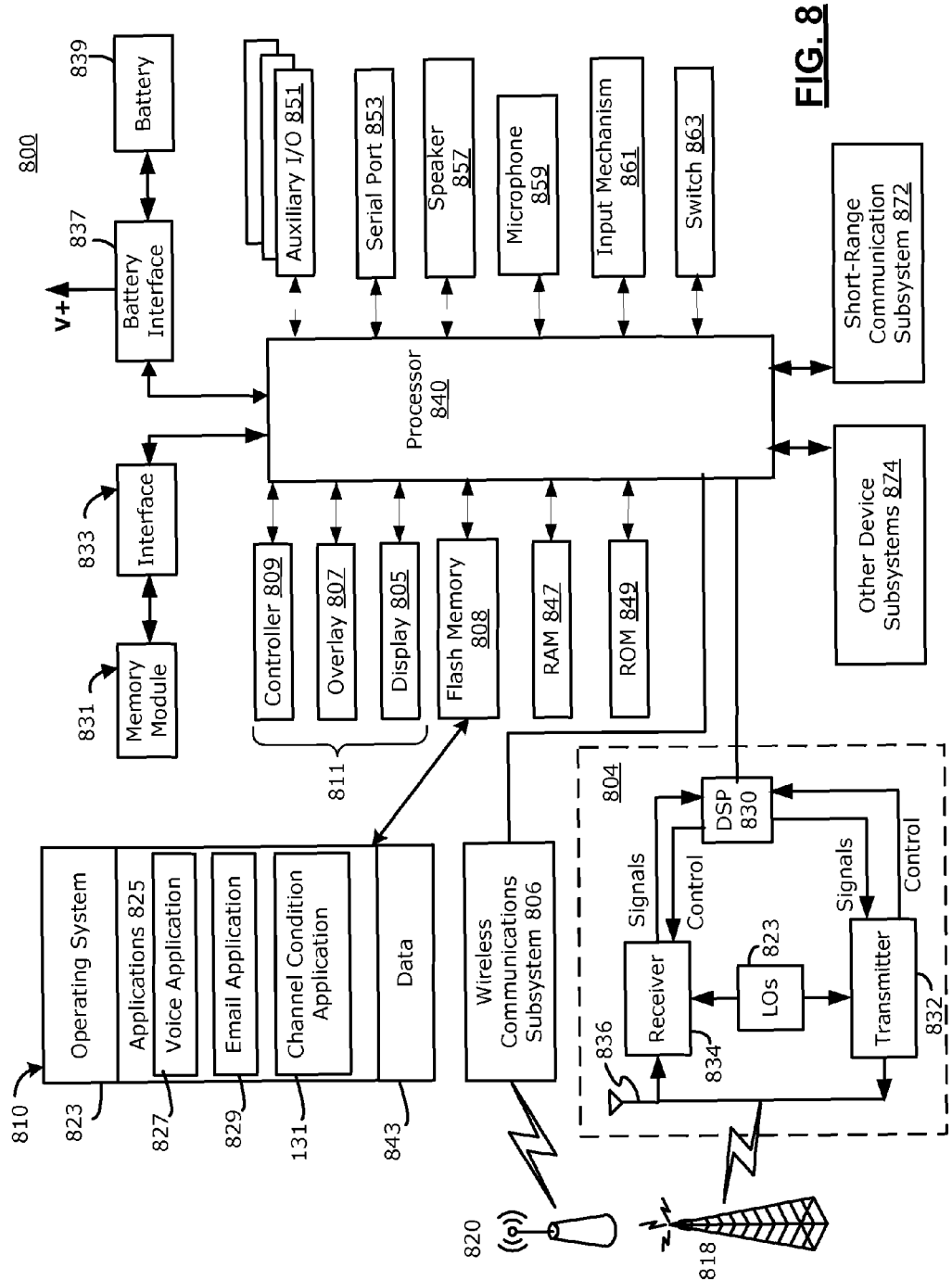
FIG. 8 illustrates a block diagram of a wireless communications device in accordance with one embodiment of the present disclosure.

FIG. 8 illustrates one embodiment of a wireless communications device 800 in which example embodiments described in the present disclosure can be applied. The wireless communications device 800 shown in FIG. 8 is an exemplary embodiment of the wireless communications devices 100, 500 described with reference to FIG. 1 and FIG.8.

The wireless communication device 800 is a two-way communication device having at least data and possibly also voice communication capabilities, and the capability to communicate with other computer systems, for example, via the Internet. Depending on the functionality provided by the wireless communication device 800, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The wireless communication device 800 includes a controller comprising at least one processor 840 such as a microprocessor which controls the overall operation of the wireless communication device 800, and a cellular communication subsystem 804 for exchanging radio frequency signals with the cellular communications network 818. The processor 840 interacts with the communication subsystem 804 which performs communication functions. The wireless communication device 800 includes a wireless communications subsystem 806 for exchanging radio frequency signals with a wireless local network (WLAN) 820. The processor 840 interacts with the communication subsystem 806 which performs communication functions. The processor 840 interacts with additional device subsystems including a display (screen) 805, such as a liquid crystal display (LCD) screen, with a touch-sensitive input surface or overlay 807 connected to an electronic controller 809 that together make up a touchscreen display 811. The touch-sensitive overlay 807 and the electronic controller 809 provide a touch-sensitive input device and the processor 840 interacts with the touch-sensitive overlay 807 via the electronic controller 809.

The processor 840 interacts with additional device subsystems including flash memory 808, random access memory (RAM) 847, read only memory (ROM) 849, auxiliary input/output (I/O) subsystems 851, data port 853 such as serial data port, such as a Universal Serial Bus (USB) data port, speaker 857, microphone 859, control keys or input mechanism 861, switch 863, short-range communication subsystem 872, and other device subsystems generally designated as 874. Some of the subsystems shown in FIG. 8 perform communication-related functions, whereas other subsystems may provide "resident" or on-device functions.

The communication subsystem 804 includes a receiver 834, a transmitter 832, and associated components, such as one or more antenna elements 836, local oscillators (LOs) 823, and a processing module such as a digital signal processor (DSP) 830. The antenna elements 836 may be embedded or internal to the wireless communication device 800 and a single antenna may be shared by both receiver and transmitter, as is known in the art and as illustrated in the wireless communications device 100 of FIG. 1. As will be apparent to those skilled in the field of communication, the particular design of the wireless communication subsystem 804 depends on the communications network 818 in which the wireless communications device 800 is intended to operate.

The wireless communication device 800 may send and receive communication signals over the cellular communications network 818 after the required network registration or activation procedures have been completed. Signals received by the antenna 836 through the cellular communications network 818 are input to the receiver 834, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 830. In a similar manner, signals to be transmitted are processed, including modulation and encoding, for example, by the DSP 830. These DSP-processed signals are input to the transmitter 832 for digital-to-analog (D/A) conversion, frequency up conversion, filtering, amplification, and transmission to the cellular network 818 via the antenna 836. The DSP 830 not only processes communication signals, but may also provide for receiver and transmitter control. For example, the gains applied to communication signals in the receiver 834 and the transmitter 832 may be adaptively controlled through automatic gain control algorithms implemented in the DSP 830.

The processor 840 operates under stored program control and executes software modules 810 stored in memory such as persistent memory, for example, in the flash memory 808. The software modules 810 comprise operating system software 823 and software applications 825. The software applications 825 may include a range of applications, including, a voice communication (i.e. telephony) application 827, an email message application 829 and a channel condition application 131. The software applications may include an address book application, a messaging application, a calendar application, and/or a notepad application, a push content viewing application, a web browser application, a map application, and a media player application (not shown). The software applications 825 may among other things, each be implemented through stand-alone software applications, or combined together in one or more of the operating system 823 or one or more of the other software applications 825. In some embodiments, the functions performed by each of the above identified modules may be realized as a plurality of independent elements, rather than a single integrated element, and any one or more of these elements may be implemented as parts of other software applications.

Those skilled in the art will appreciate that the software modules 810 or parts thereof may be temporarily loaded into volatile memory such as the RAM 847. The RAM 847 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

In some embodiments, the auxiliary input/output (I/O) subsystems 851 may comprise an external communication link or interface, for example, an Ethernet connection. The wireless communication device 800 may comprise other wireless communication subsystems for communicating with other types of wireless networks, for example, a wireless network such as an orthogonal frequency division multiplexed (OFDM) network or a GPS transceiver for communicating with a GPS satellite network (not shown). The auxiliary I/O subsystems 851 may comprise a vibrator for providing vibratory notifications in response to various events on the wireless communication device 800 such as receipt of an electronic communication or incoming phone call, or for other purposes such as haptic feedback (touch feedback).

In some embodiments, the wireless communication device 800 also includes a removable memory module 831 (typically comprising flash memory) and a memory module interface 833. Network access typically associated with a subscriber or user of the wireless communication device 800 via the memory module 831, which may be a Subscriber Identity Module (SIM) card for use in a GSM network or other type of memory card for use in the relevant wireless network type. The memory module 831 is inserted in or connected to the memory module interface 833 of the wireless communication device 800 in order to operate in conjunction with the cellular network 818.

The wireless communication device 800 stores data 843 in an erasable persistent memory, which in one example embodiment is the flash memory 808. In various embodiments, the data 843 includes service data comprising information required by the wireless communication device 800 to establish and maintain communication with the cellular network 818. The data 843 may also include user application data such as email messages, address book and contact information, calendar and schedule information, notepad documents, image files, and other commonly stored user information stored on the wireless communication device 800 by its user, and other data. The data 843 stored in the persistent memory (e.g. flash memory 808) of the wireless communication device 800 may be organized, at least partially, into a number of databases each containing data items of the same data type or associated with the same application. For example, email messages, contact records, and task items may be stored in individual databases within the device memory.

The serial port 853 may be used for synchronization with a user's host computer system (not shown). The serial data port 853 enables a user to set preferences through an external device or software application and extends the capabilities of the wireless communication device 800 by providing for information or software downloads to the wireless communication device 800 other than through the cellular network 818. The alternate download path may, for example, be used to load an encryption key onto the wireless communication device 800 through a direct, reliable and trusted connection to thereby provide secure device communication.

In some embodiments, the wireless communication device 800 is provided with a service routing application programming interface (API) which provides an application with the ability to route traffic through a serial data (i.e., USB) or Bluetooth® connection to the host computer system using standard connectivity protocols. When a user connects their wireless communication device 800 to the host computer system via a USB cable or Bluetooth® connection, traffic that was destined for a wireless network (not shown) is automatically routed to the wireless communication device 800 using the USB cable or Bluetooth® connection. Similarly, any traffic destined for the wireless network is automatically sent over the USB cable Bluetooth® connection to the host computer system for processing.

The wireless communication device 800 also includes a battery 839 as a power source, which is typically one or more rechargeable batteries that may be charged, for example, through charging circuitry coupled to a battery interface such as the serial data port 853. The battery 839 provides electrical power to at least some of the electrical circuitry in the wireless communication device 800, and the battery interface 837 provides a mechanical and electrical connection for the battery 839. The battery interface 837 is coupled to a regulator (not shown) which provides power V+ to the circuitry of the wireless communication device 800.

The short-range communication subsystem 872 is an additional optional component which provides for communication between the wireless communication device 800 and different systems or devices, which need not necessarily be similar devices. For example, the subsystem 872 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

A predetermined set of applications that control basic device operations, including data and possibly voice communication applications will normally be installed on the wireless communication device 800 during or after manufacture. Additional applications and/or upgrades to the operating system 823 or software applications 825 may also be loaded onto the wireless communication device 800 through the cellular network 818, the auxiliary I/O subsystem 851, the serial port 853, the short-range communication subsystem 872, the wireless communications subsystem 806 or other suitable subsystems 874 or other wireless communication subsystems. The downloaded programs or code modules may be permanently installed, for example, written into the program memory (i.e. the flash memory 808), or written into and executed from the RAM 847 for execution by the processor 840 at runtime. Such flexibility in application installation increases the functionality of the wireless communication device 800 and may provide enhanced on-device functions, communication-related functions, or both. For example, secure communication applications may enable electronic commerce functions and other such financial transactions to be performed using the wireless communication device 800.

The wireless communication device 800 may include a personal information manager (PIM) application having the ability to organize and manage data items relating to a user such as, but not limited to, instant messaging, email, calendar events, voice mails, appointments, and task items. The PIM application has the ability to send and receive data items via the wireless network. In some example embodiments, PIM data items are seamlessly combined, synchronized, and updated via the wireless network, with the user's corresponding data items stored and/or associated with the user's host computer system, thereby creating a mirrored host computer with respect to these data items.

The wireless communication device 800 may provide two principal modes of communication: a data communication mode and an optional voice communication mode. In the voice communication mode, the wireless communication device 800 provides telephony functions and operates as a typical cellular phone. The overall operation is similar, except that the received signals would be output to the speaker 857 and signals for transmission would be generated by a transducer such as the microphone 859. The telephony functions are provided by a combination of software/firmware (i.e., the voice communication module) and hardware (i.e., the microphone 859, the speaker 857 and input devices). Alternative voice or audio I/O subsystems, such as a voice message recording subsystem, may also be implemented on the wireless communication device 800. Although voice or audio signal output is typically accomplished primarily through the speaker 857, the display device 805 may also be used to provide an indication of the identity of a calling party, duration of a voice call, or other voice call related information.

In the data communication mode, a received data signal such as a text message, an email message, or web page download will be processed by the communication subsystem 804 and input to the processor 840 for further processing. For example, a downloaded web page may be further processed by a web browser module to parse the HTML structure and format of the web page and output the web page to the display 811. An email message may be processed by an email application module 829 and output to the display 811. A user of the wireless communication device 800 also may compose data items, such as email messages, for example, using the touch-sensitive overlay 807 in conjunction with the display device 805 and possibly the input mechanism 861 and/or the auxiliary I/O subsystems 851. These composed items may be transmitted through the communication subsystem 804 over the cellular communications network 818.

Figure 9:
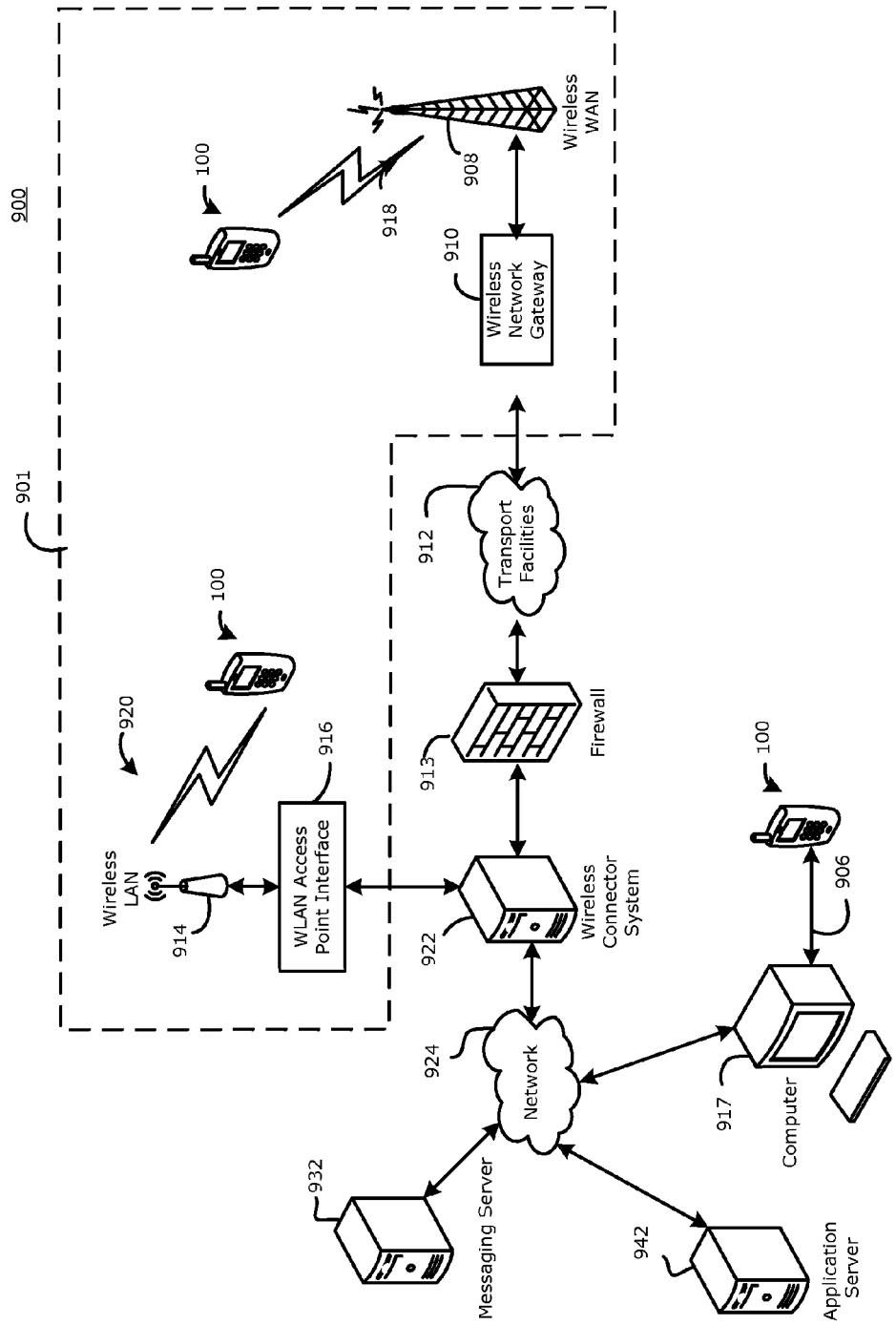
FIG. 9 illustrates is a block diagram illustrating a communications system including a wireless communications device in which example embodiments of the present disclosure can be applied.

Reference is first made to FIG. 9 which shows in block diagram form a communication system 900 in which example embodiments of the present disclosure can be applied. The communication system 900 comprises a number of wireless communication devices or mobile devices which may be connected to the remainder of system 900 in any of several different ways and which may comprise a device 100, 500, 800 as shown in FIGS. 1, 5 and 8. As an example, several instances of wireless communication devices 100 are depicted in FIG. 9 employing different example ways of connecting to system 900. Wireless communication devices 100 are connected to a wireless communication network 901 which may comprise one or more of a Wireless Wide Area Network (WWAN) 918 and a Wireless Local Area Network (WLAN) 920 or other suitable network arrangements. In some embodiments, the wireless communication devices 100 are configured to communicate over both the WWAN 918 and WLAN 920, simultaneously transmitting or receiving data for each network, and to roam between these networks. In some embodiments, the wireless network 901 may comprise multiple WWANs 918 and WLANs 920.

The WWAN 918 may be implemented as any suitable wireless access network technology. By way of example, but not limitation, the WWAN 918 may be implemented as a wireless network that includes a number of transceiver base stations 908 (one of which is shown in FIG. 9) where each of the base stations 908 provides wireless Radio Frequency (RF) coverage to a corresponding area or cell. The WWAN 918 is typically operated by a mobile network service provider that provides subscription packages to users of the wireless communication devices 100. In some embodiments, the WWAN 918 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), E-UTRA (Evolved Universal Terrestrial Radio Access), LTE™ (Long Term Evolution), IEEE 802.16e (also referred to as Worldwide Interoperability for Microwave Access or "WiMAX), or various other networks. Although WWAN 918 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 918 may further comprise a wireless network gateway 910 which connects the wireless communication devices 100 to transport facilities 912, and through the transport facilities 912 to a wireless connector system 922. Transport facilities may include one or more private networks or lines, the public internet, a virtual private network, or any other suitable network. The wireless connector system 922 may be operated, for example, by an organization or enterprise such as a corporation, university, or governmental department, which allows access to a network 924 such as an internal or enterprise network and its resources, or the wireless connector system 922, may be operated by a mobile network provider. In some embodiments, the network 924 may be realised using the internet rather than an internal or enterprise network.

The wireless network gateway 910 provides an interface between the wireless connector system 922 and the WWAN 918, which facilitates communication between the wireless communication devices 100 and other devices (not shown) connected, directly or indirectly, to the WWAN 918. Accordingly, communications sent via the wireless communication devices 100 are transported via the WWAN 918 and the wireless network gateway 910 through transport facilities 912 to the wireless connector system 922. Communications sent from the wireless connector system 922 are received by the wireless network gateway 910 and transported via the WWAN 918 to the wireless communication devices 100.

The WLAN 920 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 920 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 920 includes one or more wireless RF Access Points (AP) 914 (one of which is shown in FIG. 9) that collectively provide a WLAN coverage area. In some embodiments, the wireless communications device 100 functions as a WLAN access point 914 for other devices (not shown), including but not limited to other devices which may be tethered to the wireless communications device 100.

The WLAN 920 may be a personal network of the user, an enterprise network, or a hotspot offered by an internet service provider (ISP), a mobile network provider, or a property owner in a public or semi-public area, for example. The access points 914 are connected to an access point (AP) interface 916 which may connect to the wireless connector system 922 directly (for example, if the access point 914 is part of an enterprise WLAN 920 in which the wireless connector system 922 resides), or indirectly via the transport facilities 912 if the access point 914 is a personal Wi-Fi network or Wi-Fi hotspot (in which case a mechanism for securely connecting to the wireless connector system 922, such as a virtual private network (VPN), may be appropriate). The AP interface 916 provides translation and routing services between the access points 914 and the wireless connector system 922 to facilitate communication, directly or indirectly, with the wireless connector system 922.

The wireless connector system 922 may be implemented as one or more servers, and is typically located behind a firewall 913. The wireless connector system 922 manages communications, including email messages, to and from a set of managed wireless communication devices 100. The wireless connector system 922 also provides administrative control and management capabilities over users and wireless communication devices 100 which may connect to the wireless connector system 922.

The wireless connector system 922 allows the wireless communication devices 100 to access the network 924 and connected resources and services such as a messaging server 932 (for example, a Microsoft Exchange™, IBM Lotus Domino™, or Novell GroupWise™ email messaging server) having a global address book, and optionally other servers 942. The other servers 942 may comprise a content server for providing content such as internet content or content from an organization's internal servers to the wireless communication devices 100 in the wireless network 901, and an application server for implementing server-based applications.

The global address book (not shown) comprises electronic contact records generated and maintained by an IT (information technology) administrator of the network 924. Typically, the global address book is maintained exclusively by the messaging server 932 and there is no local copy on the mobile device 100. In addition, the global address book typically comprises contact records for all users of the respective network 924 (e.g., enterprise). The contact records in the global address book may be one or more of individual contact records (or user records) or a group address or distribution list which lists multiple individual (users).

The wireless connector system 922 typically provides a secure exchange of data (e.g., email messages, personal information manager (PIM) data, and IM data) with the wireless communication devices 100. In some embodiments, communications between the wireless connector system 922 and the wireless communication devices 100 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 910 is adapted to send data packets received from the mobile device 100 over the WWAN 918 to the wireless connector system 922. The wireless connector system 922 then sends the data packets to the appropriate connection point such as the messaging server 932 or other servers 942. Conversely, the wireless connector system 922 sends data packets received, for example, from the messaging server 932 or other servers 942 to the wireless network gateway 910 which then transmit the data packets to the destination mobile device 100. The AP interfaces 916 of the WLAN 920 provide similar sending functions between the mobile device 100, the wireless connector system 922 and network connection point such as the messaging server 932 or other servers 942.

The network 924 may comprise a private local area network, metropolitan area network, wide area network, the public internet or combinations thereof and may include virtual networks constructed using any of these, alone, or in combination. Computers 917 may be connected to the network 924 directly or indirectly via an intermediate communication network such as the Internet. When computers 917 connect to the network indirectly, e.g. via the Internet, a VPN or other mechanism for securely connecting to the network 924 may be appropriate. Computers 917 may be of any suitable construction and include at least a processor, and a display screen, one or more user input devices, and a memory each connected to the processor as is known in the art. The computers 917 could be desktop computers, laptop/notebook/netbook computers, or combinations thereof, and may have wired or wireless communication subsystems for connecting to the network 924.

A mobile device 100 may alternatively connect to the wireless connector system 922 using a computer 917 via the network 924. In at least some embodiments, for security purposes the computers 917 with which the mobile devices 100 can connect to the wireless connector system 922 are limited to computers 917 which are directly connected to the network 924. A link 906 may be provided for exchanging information between the mobile device 100 and computer 917 connected to the wireless connector system 922. The link 906 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 100 and computer 917. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations with multiple coexisting wireless networks in which the wireless communication devices 100, 500, 800 may operate. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware circuits, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for receiving data in a first wireless network and transmitting data in at least a second wireless network, the method comprising:
receiving, by a receiver of a wireless communication device, a channel of a first wireless network when a transmitter of the wireless communication device is transmitting to a second wireless network;
determining, at the wireless communication device, a first condition for the received channel of the first wireless network when the transmitter for the second wireless network is transmitting;
determining, at the wireless communication device, a second condition for the received channel when the transmitter for the second wireless network is not transmitting;
determining a difference between the first condition and the second condition; and
in response to determining that the difference between the first condition and the second condition exceeds a predetermined threshold, modifying transmission characteristics for the transmitter for the second wireless network.

2. The method of claim 1 wherein determining the first condition for the received channel of the first wireless network further comprises determining the first condition when the transmitter for the second wireless network and a transmitter for the first wireless network are both transmitting, wherein the wireless communication device includes the transmitter for the first wireless network.

3. The method of claim 2 wherein the transmitter for the second wireless network and the transmitter for the first wireless network both transmitting comprises a transmission event for the second wireless network and a transmission event for the first wireless network overlapping at least partially during a channel condition window.

4. The method of claim 3 wherein determining the second condition for the received channel when the transmitter for the second wireless network is not transmitting comprises determining the second condition at the receiver for the first wireless network when a transmission event for the second wireless network and a transmission event for the first wireless network do not overlap during a channel condition window.

5. The method of claim 2, wherein the first wireless network comprises frequency division duplex (FDD) mode network.

6. The method of claim 1 wherein the modifying transmission characteristics comprises at least one of reducing a transmission power and delaying a transmission event.

7. The method of claim 1, wherein the first wireless network comprises a time division duplex (TDD) mode network.

8. The method of claim 1 being implemented based on a determination that interference between a transmit channel of the first wireless network and a transmit channel of the second wireless network may impact the received channel.

9. The method of claim 1, wherein the first condition and the second condition comprise averages of selected samples of Channel Quality Indicators (CQI).

10. The method of claim 1, wherein the first wireless network comprises a wireless network based on long term evolution (LTE) standards and wherein the second wireless network comprises a wireless local area network (WLAN) based on IEEE 802.11 standards.

11. A wireless communications device, comprising:
a first receiver and a first transmitter for connecting to a first wireless network;
a second transmitter for connecting to a second wireless network; and
a processor configured to:
receive, by the first receiver of a wireless communication device, a channel of the first wireless network when the second transmitter of the wireless communication device is transmitting to the second wireless network;
determine a first condition for the received channel of the first wireless receiver when the second transmitter is transmitting;
determine a second condition for the received channel when the second transmitter is not transmitting;
determine a difference between the first condition and the second condition; and
in response to determining that the difference between the first condition and the second condition exceeds a predetermined threshold, modify transmission characteristics for the second transmitter.

12. The wireless communications device of claim 11, wherein the processor is further configured to determine the first condition at the first receiver when both the second transmitter and the first transmitter are transmitting.

13. The wireless communications device of claim 11, wherein the processor is configured to, in response to determine that the difference between the first condition and the second condition exceeds a first threshold, modify transmission characteristics by at least one of reducing a transmission power and delaying a transmission event for the second transmitter.

14. The wireless communications device of claim 11, wherein the processor is configured to determine the first condition and the second condition by filtered values of selected samples of channel quality indicators (CQI).

15. The wireless communications device of claim 11, wherein the first receiver and the first transmitter are configured to operate in a long term evolution (LTE) wireless network, and wherein the second transmitter is configured to operate in a IEEE 802.11wireless local area network (WLAN).

16. A non-transitory computer-readable storage medium in a wireless communications device, the medium having stored thereon computer-readable and computer-executable instructions, which, when executed, cause the wireless communications device to perform actions comprising:

determining, at the wireless communication device, a first condition for a received channel of a first wireless network when transmitter for a second wireless network is transmitting, wherein the wireless communication device includes the transmitter for the second wireless network;

determining, at the wireless communication device, a second condition for the received channel when the transmitter for the second wireless network is not transmitting;

determining a difference between the first condition and the second condition; and in response to determining that the difference between the first condition and the second condition exceeds a predetermined threshold, modifying transmission characteristics for the transmitter for the second wireless network.

\* \* \* \* \*

UNITED STATES PATENT AND TRADEMARK OFFICE
CERTIFICATE OF CORRECTION

PATENT NO. : 9,894,675 B2
APPLICATION NO. : 14/031717
DATED : February 13, 2018
INVENTOR(S) : Goran Hageltorn and Cristian Lambiri Page 1 of 1

It is certified that error appears in the above-identified patent and that said Letters Patent is hereby corrected as shown below:

In the Claims

Column 23, Line 16, In Claim 15, delete "IEEE 802.11wireless" and insert -- IEEE 802.11 wireless --, therefor.

Signed and Sealed this
Twenty-second Day of May, 2018

Andrei Iancu
*Director of the United States Patent and Trademark Office*